Figure 1:
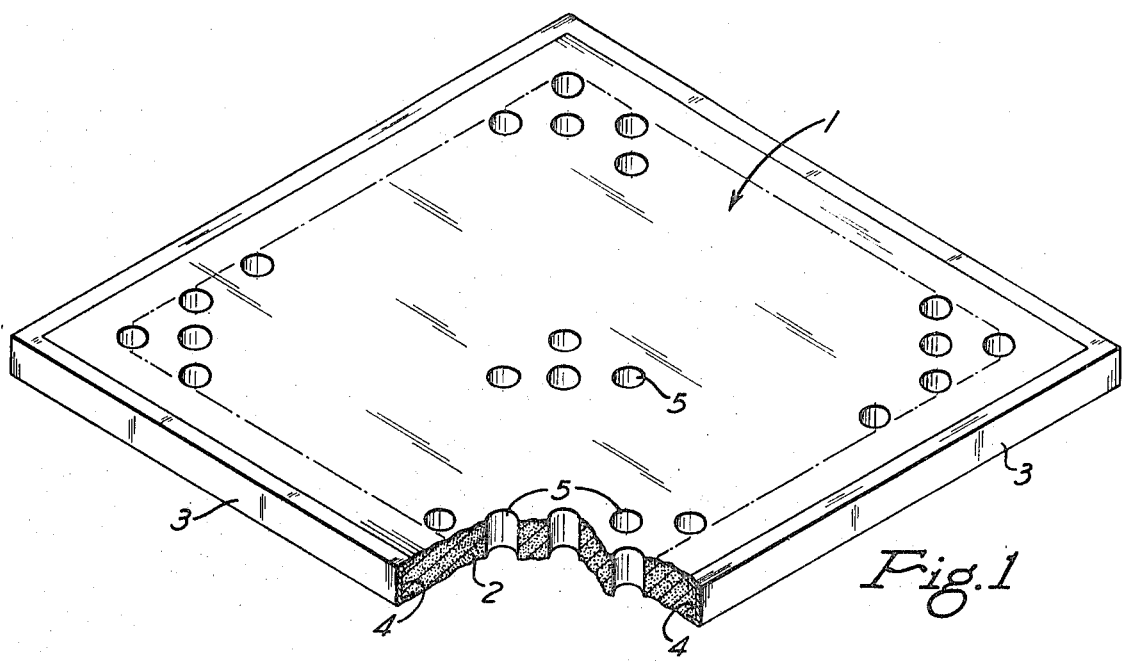

United States Patent
Clapham

[15] 3,645,072
[45] Feb. 29, 1972

[54] FILTER AND PROCESS OF MAKING SAME

[72] Inventor: Thomas Miller Clapham, Pittsburgh, Pa.
[73] Assignee: Calgon Corporation, Pittsburgh, Pa.
[22] Filed: Jan. 9, 1970
[21] Appl. No.: 1,772

[52] U.S. Cl. ........................... 55/387, 55/514, 55/524
[51] Int. Cl. .................................................. B01d 53/02
[58] Field of Search .......... 55/74, 387, 514, 524; 210/502, 210/506, 510

[56] References Cited

UNITED STATES PATENTS

| | | |
|---|---|---|
| 3,003,581 | 10/1961 | Grebbon .......................... 55/524 |
| 3,082,481 | 3/1963 | Hinde et al. ...................... 55/387 |
| 3,217,715 | 11/1965 | Berger et al. ..................... 55/387 |
| 3,474,600 | 10/1969 | Tobias .............................. 55/524 |

*Primary Examiner*—Charles N. Hart
*Attorney*—William L. Krayer

[57] ABSTRACT

A filter is made by bonding and molding a granular activated carbon within a frame of U-shaped channels. The bonded activated carbon body may be reinforced with a wire or other network, and may contain holes or areas of reduced thickness to minimize pressure drop.

8 Claims, 3 Drawing Figures

Patented Feb. 29, 1972

3,645,072

INVENTOR.
THOMAS M. CLAPHAM
BY
William L. Krayer
ATTORNEY.

3,645,072

FILTER AND PROCESS OF MAKING SAME

BACKGROUND OF THE INVENTION

It is known to utilize activated carbon to adsorb odors and noxious gases from air or other gas streams, and to remove colors and other contaminants from water and other liquids. Activated carbon has been prepared in the form of granules for many years to facilitate reactivation and to reduce pressure losses in beds, and more recently granular activated carbon has been bonded and molded into shapes suitable for adsorbing various types of vapors, odors, and the like when placed in an appropriate spot. Such molded shapes, however, are subject to erosion and the relatively weak bond of the small amount of bonding material may lead to the constant falling away of the carbon granules. The bonded shapes may be packaged in such a way as to minimize the attrition loss and even placed in a permanent insert or support. Such a solution to the problem is costly and undesirable from a manufacturing point of view because of the extra step required.

SUMMARY OF THE INVENTION

I have invented an activated carbon filter device which is simple, easy to use and make, and exhibits a minimum loss of capacity due to attrition.

My invention includes a process in which a U-shaped channel is formed into a frame of the desired size and shape, placed on a smooth flat base, and filled with a mixture of activated carbon and bonding agent. The necessary heat, solvent, or other bonding initiator is then applied, and the mold is cooled or otherwise treated to effect the proper bond. The molded and bonded activated carbon unit is thus permanently emplaced in the frame, and it may be used without any other processing.

Optionally, the filter may contain holes or relatively thin areas to minimize pressure drop. A reinforcing device such as a screen may be imbedded in the carbon on one or both sides. The frame may contain hooks, slots or the like adapted to accommodate the filter in a duct or other working emplacement.

My invention will be more particularly described with reference to the accompanying three Figures.

Figure 2:
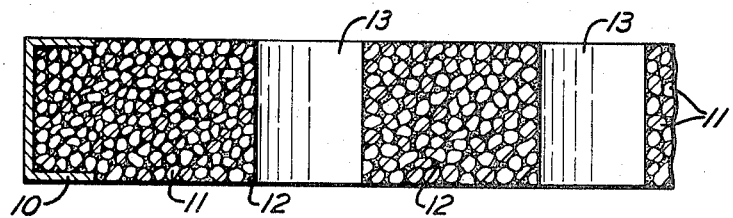
Figure 3:
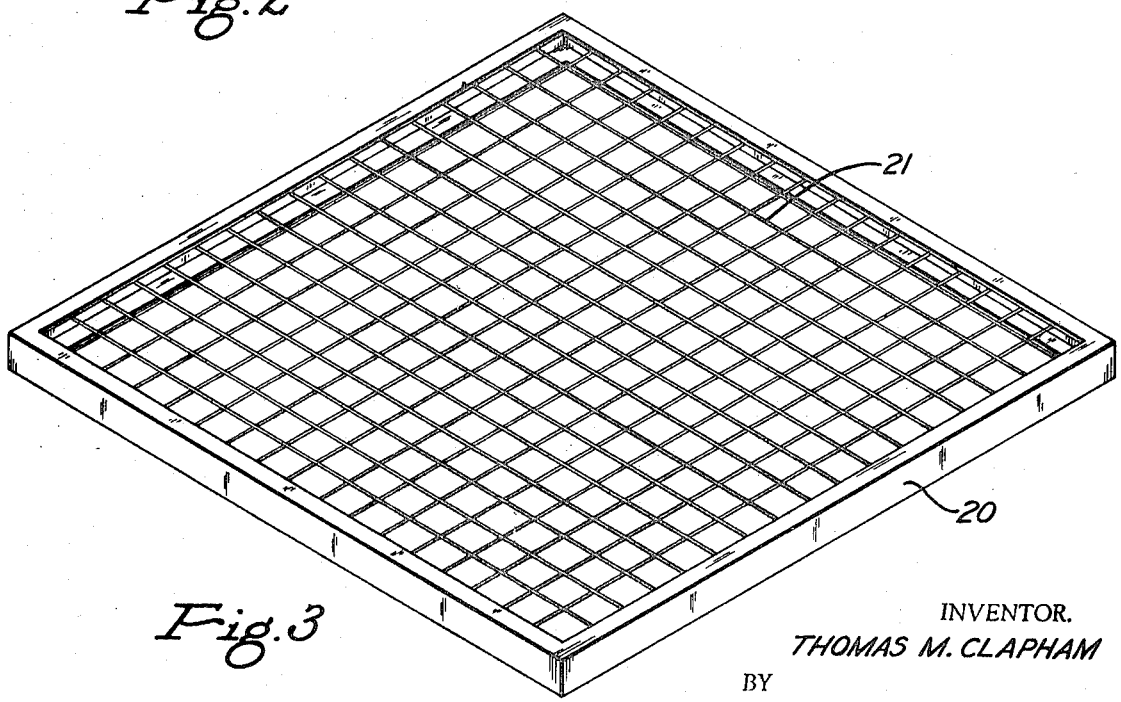

FIG. 1 is a perspective view of an air filter of my invention.
FIG. 2 is a sectional view of a portion of the same filter.
FIG. 3 is a perspective view of a frame for a similar filter, prior to the molding of the carbon, showing an optional wire support adapted to be imbedded in the carbon.

In FIG. 1, the body 1 of the filter is shown to be made of activated carbon granules 2 bonded and molded into the desired shape. The frame 3 is a U-shaped channel formed into the desired outline shape and size of the filter. The carbon fills the space of the channel at 4. Regularly spaced holes 5 extending through the carbon body are utilized in this variation to reduce the pressure drop through the filter.

In FIG. 2, the sectional view shows the channel frame 10, granules of activated carbon 11, and an enlarged view of the placement of the bonding material, 12. Sectional views of optional passages 13 for reducing pressure drop are also shown. It will be noted that the activated carbon 11 and bonding material 12 extend into and fill the frame channel 10.

FIG. 3 illustrates a channel frame 20 of the same U shape, and having placed therein an optional wire mesh or screen 21.

The mixture of granular activated carbon and bonding agent is placed in the area described by the frame, encased in a mold and heated or otherwise treated to effect adhesion and bonding. When a screen or other support is used, the bonding material is also adhered to the support, as well as the frame.

Bonding materials which may be used include thermoplastic, thermosetting, and solvent-responsive materials. I prefer to use thermoplastic materials, and particularly polyethylene. Finely divided polyethylene may be mixed with the granular activated carbon in the manner described by Tobias in U.S. Pat. No. 3,474,600. Other thermoplastic resins include monoolefin polymers such as polypropylene, polybutylene, polyamylene, poly 2-methyl amylene, ethylene copolymers with monoolefins having three to 10 carbon atoms, e.g., ethylene-propylene copolymer (9:1 or 1:1 or 1:9 on a molar basis, for example), ethylene-butylene copolymer (9:1 on a molar basis), ethylene-decene copolymer (95:5 on a weight basis) or copolymers of propylene with higher monoolefins, e.g., propylene-amylene copolymer (9:1 on a weight basis). Thermosetting resins such as acrylics or methacrylics may be used in the manner described by Lloyd in U.S. Pat. application Ser. No. 662,589 filed Aug. 23, 1967. Preferred thermosetting resins are water emulsion acrylics. The thermosetting water-insoluble vinylidene polymer is a copolymer of 2 to 20 (preferably 2 to 10) parts of acrylamide or methacrylamide or methylol or methoxymethyl acrylamide or methacrylamide with 80 to 98 parts of at least one monomer of the group of lower alkyl esters of acrylic acid and methacrylic acid, styrene, p-methyl styrene, o-methyl styrene, m-methyl styrene and acrylonitrile. Examples of alkyl acrylates and methacrylates are methyl acrylate, ethyl acrylate, propyl acrylate, isopropyl acrylate, butyl acrylate, hexyl acrylate, heptyl acrylate, n-octyl acrylate, 2-ethylhexyl acrylate, isooctyl acrylate and the corresponding esters of methacrylic acid, e.g., methyl methacrylate, ethyl methacrylate, butyl methacrylate and n-octyl methacrylate.

The preferred vinylidene compound polymer is a copolymer of acrylamide (or methacrylamide), an acrylate ester and a methacrylate ester, most preferably a copolymer of 2 to 10 percent acrylamide and 98 to 90 percent of a mixture of 1 to 3 parts of ethyl acrylate with 1 part of methyl methacrylate, e.g., a copolymer of ethyl acrylate and methyl methacrylate in a ratio of 1:1 or 2:1.

As the water-soluble thermosetting aminoplast there can be used the methylol derivatives of urea, thiourea, guanidine, cyclic ethylene urea, cyclic propylene urea, cyclic ethylene thiourea, melamine, trimethyl melamine and other alkyl melamines, triphenyl melamine and other aryl melamines, formoguanamine, acetoguanamine, benzoguanamine and other alkyl and aryl guanamines as well as other aminotriazines as set forth in Wedmer, U.S. Pat. No. 2,197,357. The preferred aminoplasts are urea and melamine-formaldehyde reaction products including dimethylol urea, sesquimethylol urea, di, tri, tetra, penta or hexamethylol melamine. Most preferably the urea or melamine-formaldehyde condensation product is modified with a lower alkanol such as methyl alcohol or ethyl alcohol. Examples of such products are dimethoxymethyl urea, trimethylol melamine trimethyl ether, pentamethylol melamine tetramethyl ether, pentamethylol melamine pentamethyl ether, N,N' bis(methoxymethyl) uron, pentamethylol melamine trimethyl ether.

Specific examples of vinylidene copolymers which are suitable are:

1. a terpolymer made from 180 parts of ethyl acrylate, 222 parts of methyl methacrylate and 21.2 parts of methacrylamide;
2. a terpolymer of 210 parts 2-ethylhexyl acrylate, 573 parts methyl methacrylate and 40 parts methacrylamide;
3. a polymer of 330 parts of ethyl acrylate, 330 parts of vinyl toluene, 15 parts of methoxymethyl methacrylamide and 15 parts of acrylamide;
4. a terpolymer of 440 parts of ethyl acrylate, 340 parts methyl methacrylate, and 37 parts of acrylamide;
5. a polymer made of 440 parts ethyl acrylate, 340 parts methyl acrylate and 37 parts acrylamide further reacted with 100 parts of styrene;
6. a polymer of 89 parts of ethyl acrylate, 110 parts methyl methacrylate, 5.25 parts methacrylamide and 5.75 parts of methylol methacrylamide;
7. a terpolymer of 52.5 parts methyl methacrylate, 42.5 parts ethyl acrylate and 5 parts methacrylamide;
8. a terpolymer of 66 parts ethyl acrylate, 26 parts methyl methacrylate and 8 parts methacrylamide;
9. a terpolymer of 42.5 parts ethyl acrylate, 52.5 parts of styrene and 5 parts methacrylamide;

10. a terpolymer of 42.5 parts of ethyl acrylate, 26.5 parts styrene, 26.5 parts methyl methacrylate and 4.5 parts methacrylamide;

11. a terpolymer of 67 parts ethyl acrylate, 33 parts methyl methacrylate and 5 parts acrylamide.

The melamine-formaldehyde or other aminoplast can be 10 to 50 percent of the total of the vinylidene polymer and the aminoplast.

The thermosetting resin mixture is normally employed as an aqueous mixture, conveniently of 40 to 70 percent solids content, although this can be varied.

Solvent casting, preferably using polystyrene resin, may be used where there is no danger that a temporary loading of the carbon with solvent will affect performance.

It should be noted that the adsorptive capacity of the carbon is largely preserved if the bonding agent contacts each granule over a minimum surface area. Also the pressure drop of the filter is much less when as much open space as possible is permitted between the carbon granules. For these reasons, the preferred bonding agent is in the form of small particles, and the heating or other bonding process is abbreviated so contact is made over a minimal area of the carbon. The space occupied by the bonding agent should be no greater than one-half of the empty space remaining.

The frame may be of any rigid material and should not be adversely affected by the bonding and molding processes. Metal, glass, wood, plastic, etc., may be used for appropriate results. It may be possible for the frame to be of the same composition as the bonding agent, in order to effect a superior bonding of the carbon and the bonded carbon structure to the frame provided the material does not deform at bonding conditions. Where the material of the frame is not the same as the bonding agent, an improvement may be achieved by utilizing a material having an affinity for the bonding agent.

The granular activated carbon may range in mesh size from 4 or 6 through 20 or 50. It normally will have a surface area of from 600 to 1,400 square meters/gram.

I claim:

1. A filter device comprising a rigid, U-shaped channel frame and a filter body within and bonded to the interior of said frame, said filter body consisting essentially of granular activated carbon having a mesh size of from 4 to 50 small particles of a bonding agent for bonding the carbon granules into a unitary shaped mass having open spaces between said granular activated carbon and said bonding agent, said bonding agent occupying no more than one-half the available space between the carbon granules.

2. Device of claim 1 in which the frame is made of the same material as the bonding agent.

3. Device of claim 1 in which the bonding agent is a thermoplastic resin.

4. Device of claim 3 in which the bonding agent is polyethylene.

5. Method of making a filter device comprising forming a U-shaped channel into a frame, filling the space defined thereby with a mixture consisting essentially of granular activated carbon having a mesh size of from 4 to 50 and small particles of a bonding agent therefor, and bonding the activated carbon granules into a coherent mass having open spaces between said granular activated carbon and said bonding agent.

6. Method of claim 5 in which the bonding agent is a thermoplastic resin.

7. Method of claim 6 in which the bonding agent is polyethylene.

8. Method of claim 5 in which the bonding agent is a thermosetting resin.

* * * * *